United States Patent
Anderson et al.

(10) Patent No.: US 8,810,464 B2
(45) Date of Patent: Aug. 19, 2014

(54) COMPACT HIGH EFFICIENCY INTREGRATED DIRECT WAVE MOBILE COMMUNICATIONS TERMINAL

(75) Inventors: Richard B. Anderson, Aurora, OH (US); Matthew Flannery, Girard, OH (US); Geoffrey Rochat, Mendon, MA (US)

(73) Assignee: Anderson Aerospace, Kent, OH (US)

( * ) Notice: Subject to any disclaimer, the term of this patent is extended or adjusted under 35 U.S.C. 154(b) by 343 days.

(21) Appl. No.: 13/469,903

(22) Filed: May 11, 2012

(65) Prior Publication Data

US 2012/0286990 A1    Nov. 15, 2012

Related U.S. Application Data

(60) Provisional application No. 61/485,114, filed on May 11, 2011.

(51) Int. Cl.
*H01Q 19/06* (2006.01)
*H01Q 15/02* (2006.01)
*H01Q 3/08* (2006.01)
*H01Q 19/10* (2006.01)
*H04B 7/185* (2006.01)
*H01Q 15/16* (2006.01)

(52) U.S. Cl.
CPC ............ *H04B 7/18508* (2013.01); *H01Q 3/08* (2013.01); *H01Q 15/02* (2013.01); *H01Q 19/10* (2013.01); *H01Q 15/16* (2013.01)
USPC .......................................... 343/754; 343/909

(58) Field of Classification Search
USPC .............................. 343/753, 754, 909, 911 R
See application file for complete search history.

(56) References Cited

U.S. PATENT DOCUMENTS

| | | | |
|---|---|---|---|
| 4,228,410 A | 10/1980 | Goudey et al. | |
| 4,884,631 A | 12/1989 | Rippel | |
| 5,973,647 A | 10/1999 | Barrett et al. | |
| 6,388,621 B1 | 5/2002 | Lynch | |
| 6,751,442 B1 | 6/2004 | Barrett | |
| 6,950,073 B2 | 9/2005 | Clymer et al. | |
| 7,181,160 B2 | 2/2007 | Barrett | |
| 7,251,223 B1 | 7/2007 | Barrett et al. | |
| 7,403,166 B2 * | 7/2008 | Clymer et al. | 343/713 |
| 7,791,549 B2 | 9/2010 | Clymer et al. | |
| 7,911,400 B2 * | 3/2011 | Kaplan et al. | 343/713 |
| 7,999,750 B2 * | 8/2011 | Mansour et al. | 343/757 |
| 2004/0180707 A1 | 9/2004 | Barrett | |
| 2006/0071876 A1 | 4/2006 | Clymer et al. | |
| 2011/0215985 A1 * | 9/2011 | Kaplan et al. | 343/879 |
| 2011/0308782 A1 | 12/2011 | Merrill et al. | |

* cited by examiner

*Primary Examiner* — Robert Karacsony
(74) *Attorney, Agent, or Firm* — George W. Moxon, II; Brian P. Harrod

(57) ABSTRACT

A compact mobile satellite communications system, including an integrated direct wave antenna and a low profile precision antenna positioning system, where the integrated direct wave antenna is configured to provide the minimum swept volume when steered and pointed such that it moves completely within a ten inch sphere, which provides an advantage when the system is mounted on a moving vehicle such as an aircraft, and the integrated direct wave antenna includes a refractive component as well as down conversion electronics to provide a L band signal output.

13 Claims, 7 Drawing Sheets

COMPACT HIGH EFFICIENCY INTREGRATED DIRECT WAVE MOBILE COMMUNICATIONS TERMINAL

BACKGROUND OF THE INVENTION

This invention relates to a system and antenna assembly for mobile satellite communication, television, and broadband services in the Mobile Satellite Service (MSS) industry.

Conventional antenna systems incorporate reflectors to concentrate and boost signal strength or incorporate multiple antenna elements such as patch or slot arrays. In some cases multiple horns are used to provide an array of antenna elements. For purposes of this application, a horn, horn antenna or microwave horn is an antenna that consists of a flaring metal waveguide shaped like a horn to direct radio waves in a beam. When multiple antenna elements are used to increase aperture, the signals are summed in waveguide or printed circuit feeds and may include orthomode transducers and or combiners. The aperture is defined as the area, oriented perpendicular to the direction of an incoming radio wave, which would intercept the same amount of power from that wave as is produced by the antenna receiving it. These are subject to performance degradation due to losses in the reflections or connections used to combine and amplify the satellite signal. As a result, the size of the antenna aperture needs to increase to compensate for the accumulated losses.

In an attempt to increase aperture for mobile applications, antennas often are configured in long and narrow shapes which allow for reduced height but require wider sweep. These can be multi-element configurations or low profile dishes. These can be 34 inches wide and as high as 12 inches. When mounted on a vehicle such as an aircraft, these systems result in increased drag and lower fuel efficiency. The aerospace industry, in general, is striving for smaller and smaller antenna arrays. Smaller arrays reduce drag and reduce weight. Reduced drag and weight results is reduced fuel usage, which results in cost savings and increased profit.

There is therefore a need for an improved communications system which provides a compact high efficiency antenna for mobile applications.

SUMMARY OF THE INVENTION

The present invention is directed to a compact high efficiency mobile satellite communication system for use in or on a vehicle is provided. This system receives and/or transmits satellite signals in the K, Ku, or Ka bands. The system comprises an integrated direct wave communications terminal, a low profile antenna positioning system, and pointing & control electronics. The system may include an integrated attitude and heading module or may utilize attitude and heading information provided by the vehicle. The control electronics determines the orientation of the integrated direct wave terminal aperture relative to the vehicle and provides the control signal to the low profile antenna positioning system so as to maintain the aperture pointed at the desired satellite.

According to another aspect of the invention, the integrated direct wave terminal receives and or transmits in the Ku band.

According to another aspect of the invention, the integrated direct wave terminal receives and or transmits in the K band.

According to a further aspect of the invention, the integrated direct wave terminal receives and or transmits in the Ka band.

According to a further aspect of the invention, the integrated direct wave terminal receives and or transmits in the Ku, K and Ka band.

BRIEF DESCRIPTION OF THE DRAWINGS

The foregoing and other features and advantages of the present invention will become apparent to those skilled in the art to which the present invention relates upon reading the following description with reference to the accompanying drawings, in which like reference characters refer to like elements through the different figures and in which.

DETAILED DESCRIPTION OF THE INVENTION

The present invention is directed to a compact high efficiency mobile satellite communication system for use in or on a vehicle. This system receives and/or transmits satellite signals in the K, Ku, or Ka bands. The system comprises an integrated direct wave communications terminal, a low profile antenna positioning system, and pointing & control electronics. The system may include an integrated attitude and heading module or may utilize attitude and heading information provided by the vehicle. The control electronics determines the orientation of the integrated direct wave terminal aperture relative to the vehicle and provides the control signal to the low profile antenna positioning system so as to maintain the aperture pointed at the desired satellite.

A key improvement is in the efficiency. A dish is generally about 55% efficient, and top quality antennas or dishes top out at about 70% efficient. The present invention achieves a high level of performance for a 9.6 inch aperture with the efficiency in the range of 70% to 85% with a minimum Gain over Temperature (G/T) of 9.3 to 11.5. The system as described here can also be scaled to a larger aperture to increase the overall gain of the antenna. For example, if the size of the aperture were increased to 11.5 inches the G/T would increase up to 11.7.

The present invention is a high efficiency compact integrated direct wave communications terminal and system for pointing and position control. The terminal is mounted on a vehicle, which could be an aircraft, boat, train, bus, UAV, or any other vehicle. The terminal is part of a communications system which transmits and receives data via satellite. Since the orientation of the terminal relative to geostationary satellites changes when the vehicle is moving, the system is provided with a pointing computer that compensates for changes in one or all of pitch, roll or yaw of the vehicle.

Figure 1:
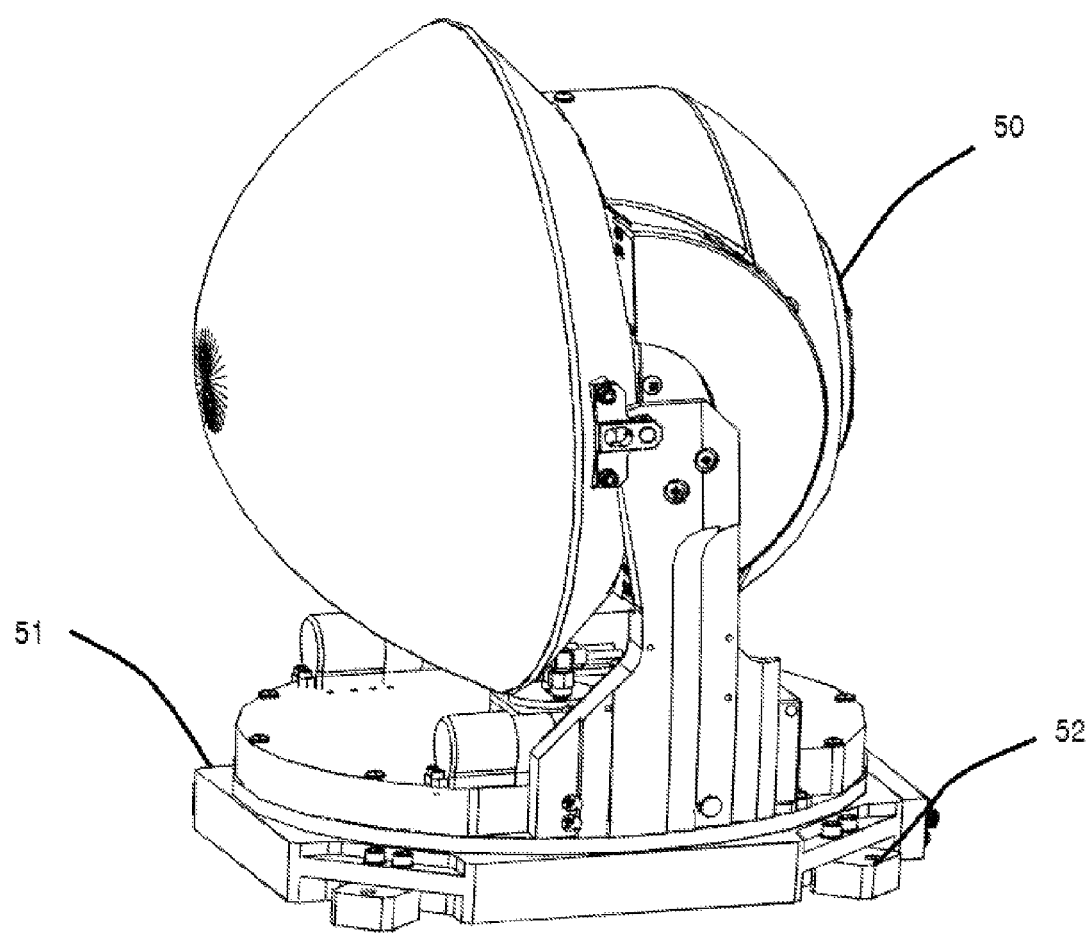
FIG. 1 is a perspective view of the integrated direct wave terminal mounted on its low profile positioning system.

As seen in FIG. 1, the system is provided with the integrated direct wave terminal 50 mounted on its low profile compact positioning system 51. The integrated direct wave terminal rotates within a sphere, which preferably is a ten inch sphere. The invention will be described in the context of a ten inch sphere, but is not limited to ten inches and could be larger or smaller. A ten inch sphere would be a desirably smaller unit than most currently available systems, but would achieve the same functionality.

The low profile pointing and position control system 51 is less than ten inches long by ten inches wide and less than two inches tall. This provides a total envelope that is under 12 inches tall and 10 inches wide by 10 inches long. The system can be bolted directly to the vehicle or custom mounted via feet 52, which can provide an interface to an existing bolt pattern (not shown). The incorporation of the motor drive electronics into a low profile positioning system 51 reduces cable runs, connectors, and total part count for weight savings and improved reliability.

Figure 2:
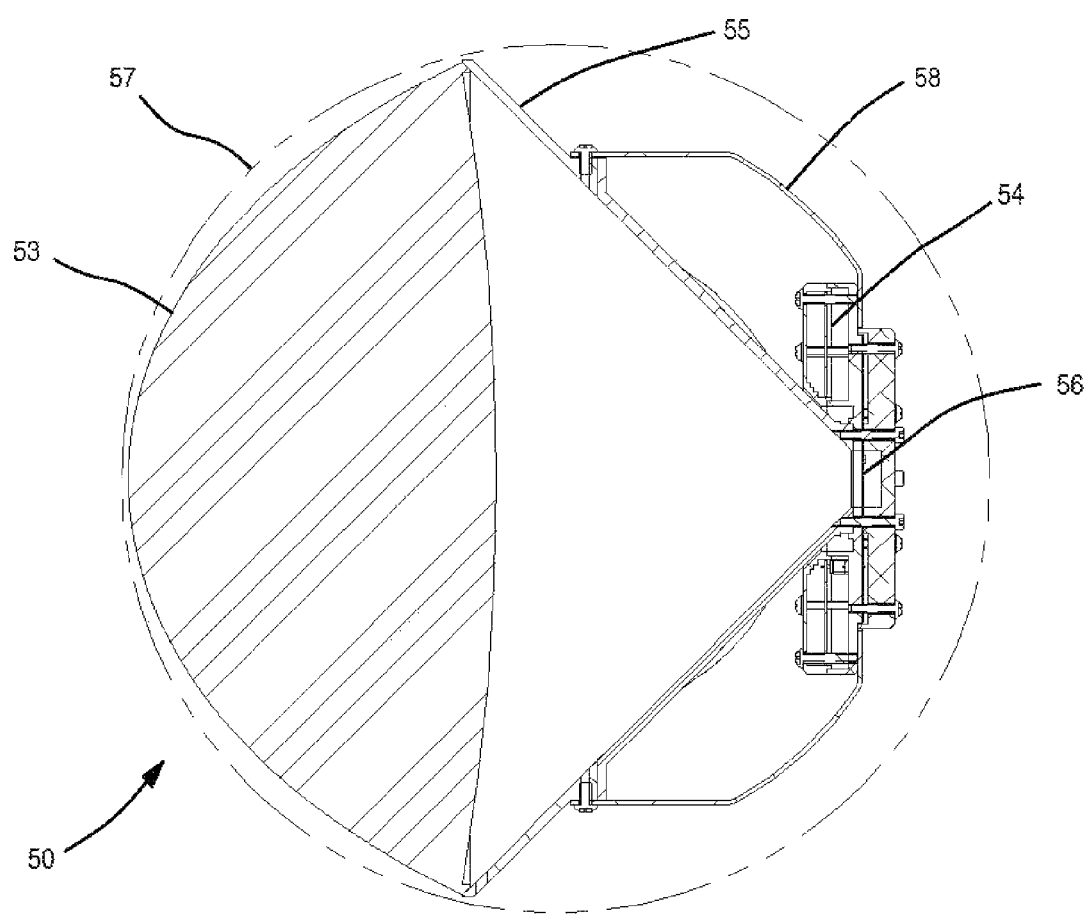
FIG. 2 is a cross section view of the integrated direct wave communications terminal.

As seen in FIG. 2, the integrated direct wave communications terminal 50 is the integration of a non-symmetric multi-curve microwave refractive component 53, a refractor support 55, and down conversion electronics, specifically the Low Noise Block-Downconverter (LNB) 54 into a single device. The refractor support 55 may be a horn antenna or may be another kind of antenna. The satellite signal is down converted from Ku, K, and or Ka band to L band on the down conversion electronics 54. This provides a greater efficiency in distributing the received satellite signal to the modem or receiver which may be mounted many feet away from the terminal. The down conversion electronics 54 are protected from the environment by a protective housing 58. When used in the receive mode the direct wave aperture, communications terminal 50 utilizes a refractive component 53, at the initial point of energy interception, to concentrate and focus the satellite signal 62 (see FIG. 3) at the final point of energy transmission 56. When used in the transmit mode, the signal 62 (see FIG. 3) is launched at the focal point 63 (see FIG. 3) and is coherently transmitted through the refractive component 53. The integrated direct wave communications terminal 53 is configured to rotate within a 10 inch diameter spherical volume 57. This is a significant reduction in volume, as typical antennas rotate within a 12 inch diameter sphere or in the case of fuselage-mounted systems, rotate in a 34 inch diameter that is 10 inches high.

The Low Noise Block-Downconverter (LNB) 54 is designed as an integrated part of the compact antenna. Typical LNB's would extend outward from the antenna. This design is contained within the antenna allowing for a more compact footprint. This also provides additional mechanical advantages for the gimbal control and center of gravity. The LNB is designed with a minimum of two pieces for a modular configuration. A significant advantage is realized during module test. The modular design allows for less complex and more precise tuning since the testing is limited to only a few components. Modularity also provides a re-use or upgrade advantage. An LNB front end designed for circular polarization could be used with multiple LNB down converter modules to also provide linear polarization or additional operating frequencies such as Ku Band, K Band and Ka band. The LNB down converts each polarity to two unique L Band outputs. An upgraded LNB down converter module could use the same LNB front end but down convert and stack the signals onto a single L-band/C-band output connector.

Figure 3:
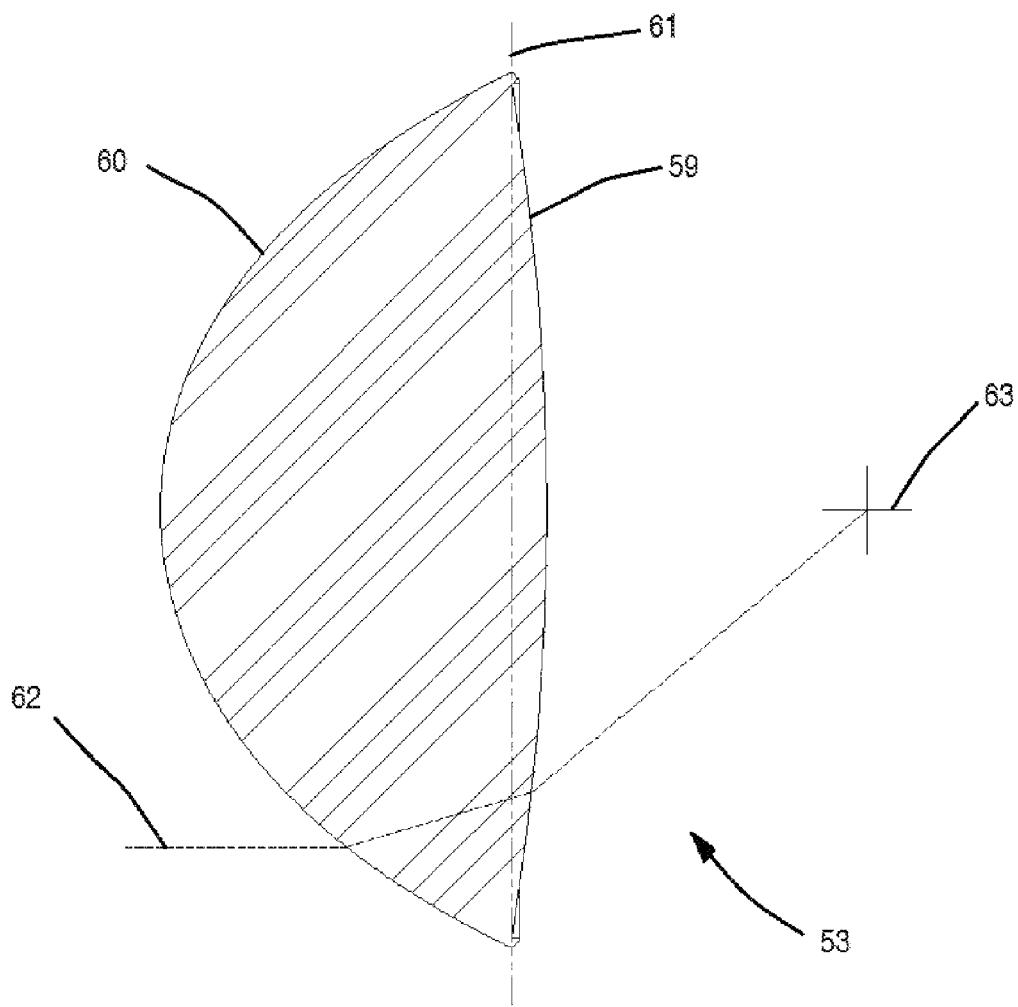
FIG. 3 is a cross section view of the non-symmetric multi-curve microwave refractor.

The non-symmetric multi-curve microwave refractive component 53 may be made of any appropriate material or shape, including, but not limited to homogeneous dielectric material, a conductive surface with various openings or a set of elements that are conductive, semi-conductive or have any combination of permittivity and permeability that may be imbedded in a support structure 55 that may or may not add to the refractive property of the refractive component 53. As seen in FIG. 3, the elements that may constitute or be a part of the refractive component 53 may move or remain stationary and may be electronically or electromagnetically controlled to alter their position, to alter their size and shape or to attach or detach various combinations of the elements. This may be done to move the direct wave aperture beam pointing direction and/or to optimize the direct wave aperture frequency of operation. The curve of each surface 60 59 can be adjusted to change the focal point 63 and the center of gravity of the refractor. It is desirable to adjust the center of gravity to provide a balanced load when pointing at the satellite. The microwave refractive component 53 is constructed from Ultra-High-Molecular-Weight Polyethylene (UHMWPE) which provides a desirable dielectric constant and low radio absorption. When used in harsh environments, such as environments with temperatures ranging between −55° C. to 80° C., and high humidity, the UHMWPE naturally sheds condensation. Condensation could degrade the performance of the integrated direct wave communications terminal 50.

Figure 4:
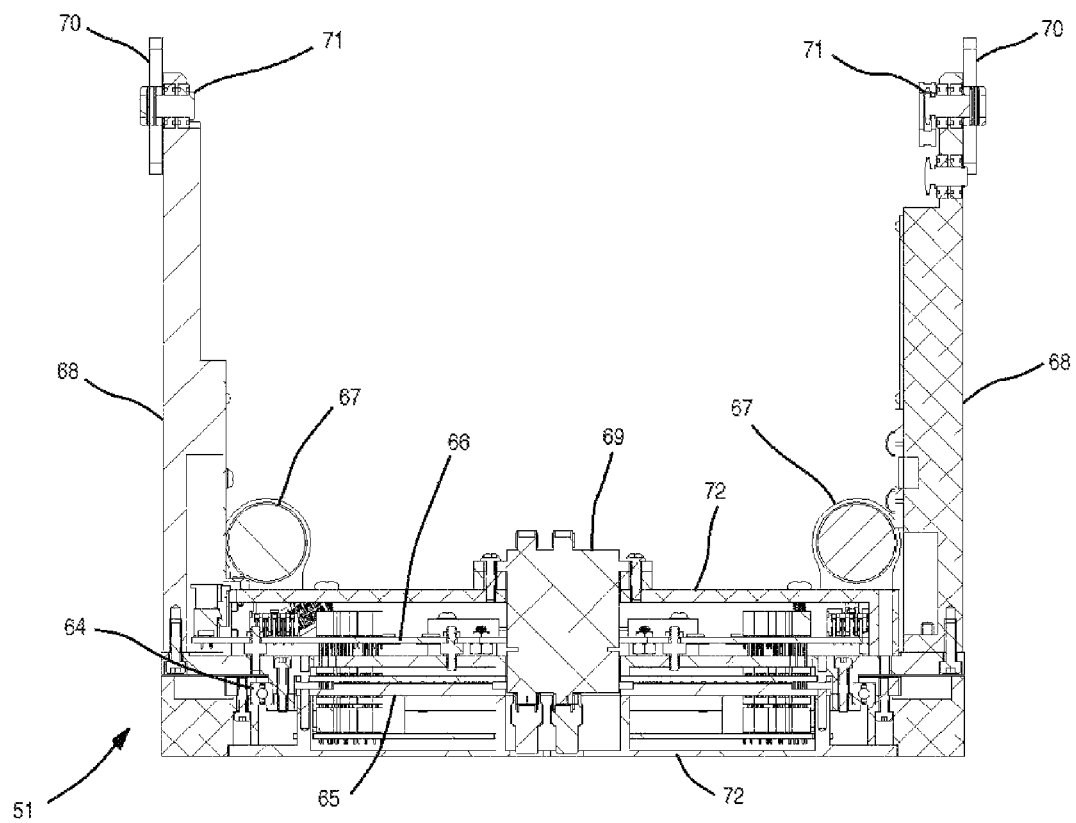
FIG. 4 is a cross section view of the low profile compact positioning system.

As seen in FIG. 4, the low profile compact positioning system 51 provides all necessary structural support to carry and point the integrated direct wave terminal. This system includes a main cross contact bearing 64, a slip ring 65, motor control electronics 66, motors 67, vertical support arms 68, rotary joint 69, gear boxes 70, control electronics 71, and covers 72.

Figure 5:
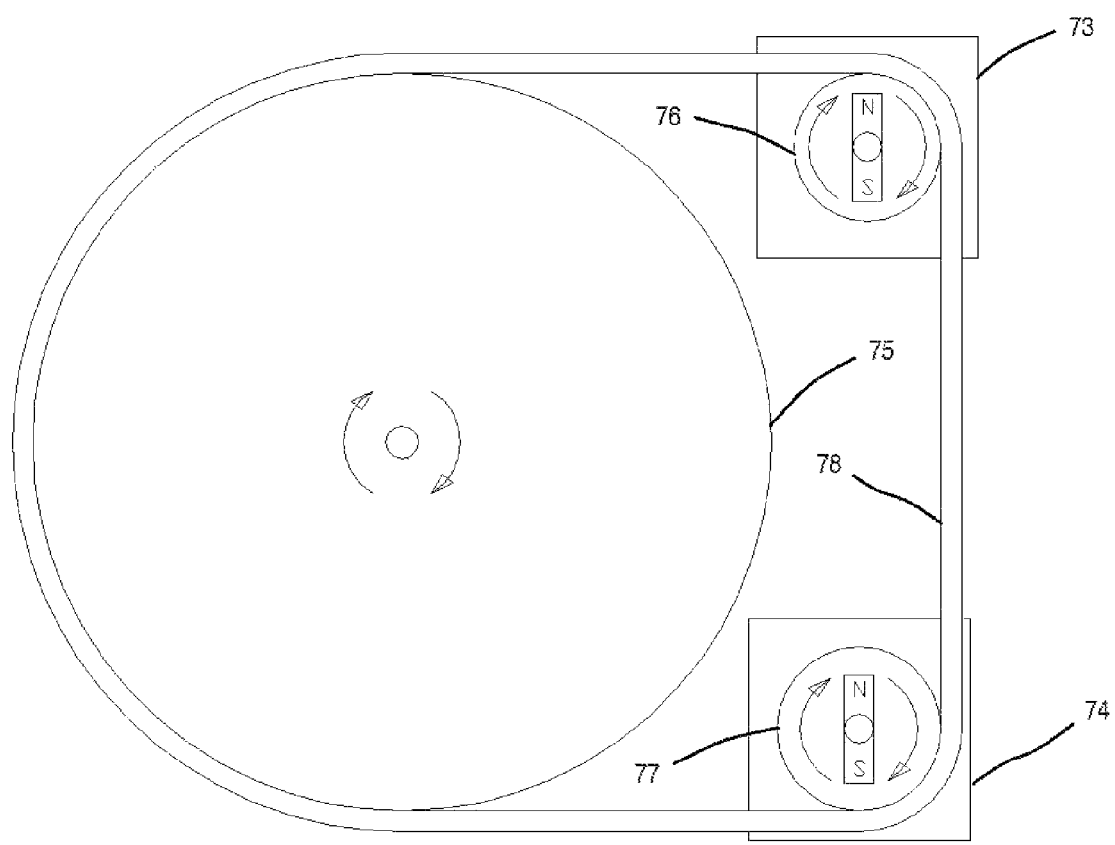
FIG. 5 is a top view of the multi-encoder off center precision positioning device.

FIG. 5 shows the multi-encoder off center precision positioning device that includes two encoder chips 73 and 74, which are located off the center of rotation. The magnetic actuators, 76, 77 are geared in relation to the main rotating device 75. One magnetic actuator 76 is geared at a 10:1 ratio and the other magnetic actuator 77 is geared at a 9:1 ratio. The 10:1 magnetic encoder 73 measures ten rotations in a single rotation of the main rotating device 75 and the 9:1 magnetic encoder 74 measures nine rotations in a single rotation of the main device 75. The combination of the readings from both encoders provides a unique precise position for the main rotating device 75. The encoder actuators 76 & 77 are driven from the main rotating device 75 by a common ultra-low backlash direct drive component 78.

In one embodiment, Brushless Direct Current (BLDC) motors 67 (best seen in FIG. 4) are used to move the low profile compact positioning system 51 in the azimuth and elevation axes. The BLDC motors 67 are powerful motors in a small package volume and since they are without brushes they have long lives to wear out. A BLDC motor is a variant of a 3-phase AC induction motor. Both motor types have three stator windings that are intended to be fed with currents that are 120 degrees out of phase. Where they differ is that a 3-phase AC induction motor's rotor magnets are electromagnets that are energized by the AC magnetic field that drives the stator windings, while a BLDC motor's rotor magnets are high-strength permanent magnets, usually made from rare-earth compounds. Since the rotor's magnets are permanent a BLDC motor does not have to maintain an AC magnetic field to operate. A rotating DC magnetic field is required to get the motor to turn, but if the magnetic field from the stator windings becomes static, the motor stops turning and locks in place. The torque generated by the motor is not affected by the speed at which the magnetic field of the stator windings rotates, making BLDC motors ideal for use in servo systems.

To operate a BLDC motor, its stator windings magnetic field must be controlled externally, and this is often done with a microprocessor driving pulse-width modulator (PWM) power switches, that then feed current pulses of varying widths to the motor's 3 stator windings. The motor's windings act as current integrators, turning the current pulses into the equivalent of current sources whose current is proportional to the pulses' on/off ratios. The torque provided by the motor is proportional to the total current flow through the motor, and the speed at which the motor turns is the speed at which the vector of the current driving the three motor windings, which are driven 120 degrees out of phase, rotates. The motors 67 are 4 pole motors, where the stator electromagnets are arranged in a hextet with two north poles and two south poles, alternating around the stator. In the case of a 4-pole motor it takes two rotations of the magnetic field to make one rotation of the motor 67. There are higher pole motors, always with an even number of poles, which require proportionately higher rotations of their stator magnetic fields to achieve one turn of the motor.

Since BLDC motors have no brushes they also have no commutators. Because of this the external drive circuitry must be informed of the angular position of the rotor at startup, otherwise the external drive circuitry could apply the wrong drive to the motor and end up running the motor in the wrong direction. To provide this information, most BLDC motors have three Hall-effect switching sensors arrayed every 120 degrees around the stator that measure the position of the rotor's permanent magnet. Between the three of them the motor reports a 3-bit, 6-sequence Johnson pattern that indicates the position of the rotor to within the nearest 60 degrees.

Hall-effect sensors are used to tell the drive electronics which phase to use to start a BLDC motor, but they can also be used in closed loop velocity controlled servo systems. The pulse rate of any one BLDC Hall-effect sensor is proportional to the rotational velocity of the motor, and so the output of one or more of a BLDC's Hall-effect switches can be the feedback information required to maintain a specified motor speed. This is common practice. The invention, then, is to use a BLDC motor's Hall-effect sensors to provide continuous, as opposed to simply startup information, feedback to a position control servo system that controls, not just the angle of the rotor of the motor, but the angular position of an entire axis driven by that motor. Using a BLDC Motor's Hall-effect sensors to provide continuous position feedback to a position control servo system does not preclude using these sensors to also provide angular velocity feedback from that motor. Typically a position control servo system consists of a torque control servo loop inside a velocity control servo loop, which itself is inside the outer position control servo loop. This invention allows, but does not require, a BLDC motor's Hall-effect sensors to serve double duty in two of these loops.

The present invention will detect transitions in BLDC motor Hall-effect sensor patterns, and from that to provide both counting and direction information for relative position control. The motors 67 have a 6-sequence Johnson pattern, so we can count to measure ⅙th of a motor's rotation. Critical to this method is finding a means of increasing the "gain" of this angular measurement to get better resolution through the position control servo system than is provided by a motor's Hall-effect sensors in one rotation. This is done by combining two means of angular measurement, Hall-effect sensor pattern counting with an absolute Gray encoder 80, with an extra twist: In our system the motors 67 are geared down when driving the two axes, and we implement an overall gear ratio of at least 600:1 on both axes, with a count of 6 per motor rotation due to the Hall-effect switches we achieve the 1 part in 3600 resolution needed. (The calculation is gear_ratio≥required_resolution/count_resolution, in our case gear_ratio≥3600/6. The azimuth axis uses a gear ratio of 1000.4/1, and the elevation axis has a gear ratio of 750.3:1. That means the effective position can be determined to 1 part in 6002.4, or about 0.06 degrees of arc, in the azimuth axis, and 1 part in 4501.8, or about 0.08 degrees of arc, in the elevation axis.

Figure 6:
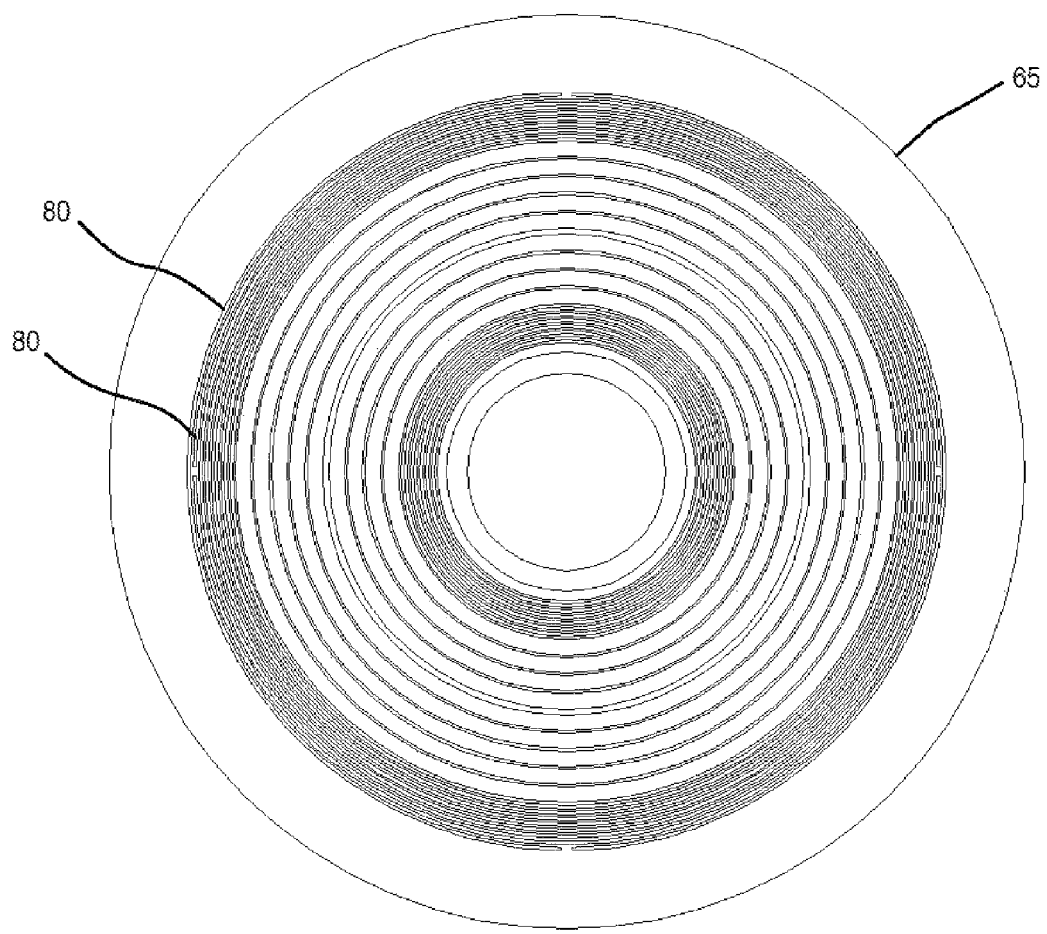
FIG. 6 is a top view of the slip ring.
Figure 7:
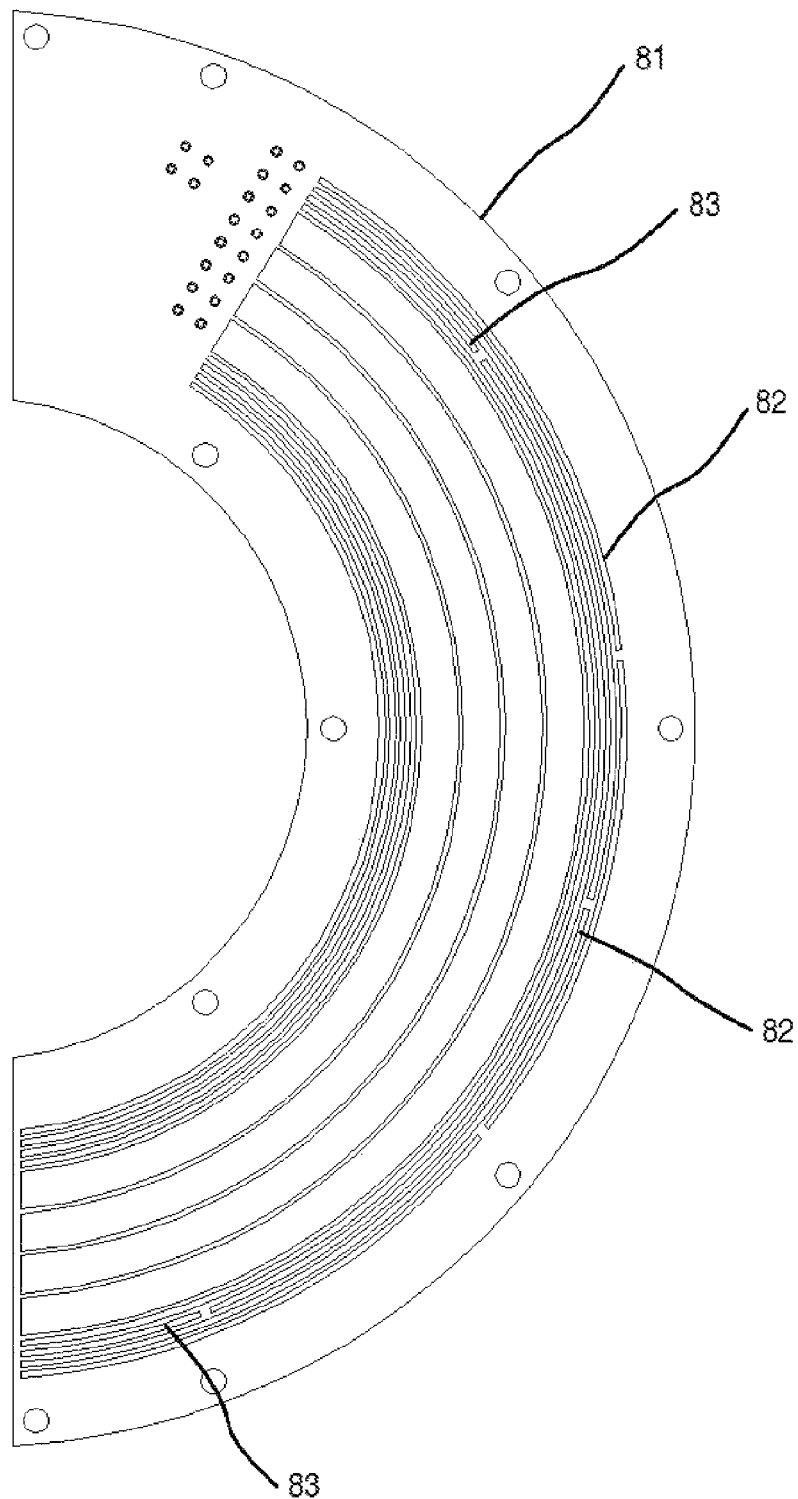
FIG. 7 is a side view of the elevation slip ring.

There are many ways of presenting the count and direction information derived from the Hall-effect sensors to a microprocessor, but the specific method we have chosen to use is to emulate a standard quadrature encoder 80 (FIG. 6) built into the azimuth slip ring 65, and a custom encoder 82 (FIG. 7) built into the elevation slip ring 81 (FIG. 7), providing a 2-bit Gray pattern whose sequence provides both count and direction, as described above. Included in the elevation slip ring 81 are limit switches 83 that prevent motion beyond the required range. The reason for this is that the microprocessors are equipped with built-in quadrature encoder interfaces that take those 2-bit Gray patterns and decode them to drive a bidirectional position counter. Emulating this interface, in a Field-Programmable Gate Array (FPGA) for convenience and to maximize circuit density, provides a convenient interface our microprocessors are already designed to handle, and that makes for smaller, denser circuitry and lowers costs.

The Synthetic Counting Encoder Method affords two different modes of operation, Absolute Encoder-Centric Mode and Counter-Centric Mode, depending on which of the two encoders one considers to be of primary importance. In Absolute Encoder-Centric Mode operation, at startup the axis is rotated until an absolute Gray encoder pattern change is detected. This point is declared to be a "relative home." The position counter is zeroed at this point, eliminating any need to compensate for an offset bias. As the axis rotates in operation, since the position of the relative home is known relative to the aircraft by virtue of the structure of the low profile compact positioning system 51, the angular position of the axis being measured is the position of the relative home in relation to the vehicle, plus or minus the current angular position measured by the position counter. As the axis of rotation moves to a new absolute Gray encoder state the process is repeated, creating new relative homes from which to make measurements. In the Absolute Encoder-Centric Mode, then, the absolute Gray encoder provides a coarse angular position measurement, which is refined by the fine angular position measurement provided by the position counter.

In Counter-Centric Mode operation, at startup the axis is rotated until an absolute Gray encoder pattern change is detected. The point is declared to be "home." The position counter is zeroed at this point, eliminating any need to compensate for offset bias. From here on out, as the axis rotates the position counter provides the angular position of the axis, relative to home. There is no further need to consult the absolute Gray encoder at all, other than to eliminate any accumulated count errors by zeroing the position counter when the initial absolute Gray encoder pattern reappears. (This applies so long as the position counter has sufficient bits to not overflow or underflow during a complete rotation around an axis. Should this not be the case then microcomputer software must monitor position counter overflows and underflows, and effectively synthesize higher order position counter bits that increment on overflows and decrement on underflows. It is rather simpler just to make the position counter long enough not to overflow.)

Because absolute Gray encoder brushes are of finite size, the exact location of the appearance of an absolute Gray encoder pattern is dependent on the direction of rotation. For this Mode to work one must keep track of the Gray pattern that was determined at startup to use as home, as well as the pattern that precedes home while the axis is in motion at startup. That pattern can be referred to as "pre-home." During subsequent axis rotation the transition from the pre-home pattern to the home pattern, or from the home pattern to the pre-home pattern, signals a home condition, and the position counter can be zeroed. This algorithm ensures that the same absolute Gray encoder brush edges indicate a home condition regardless of the direction of rotation, and that compensates for brushes of finite size.

In fact the absolute Gray encoder need only be a single index bit as a reference to the vehicle, although having an absolute Gray encoder with more than one bit allows the system to select one of several homes, thereby minimizing axis rotation when searching for a home at startup. In our particular design the azimuth axis uses a 2-bit absolute Gray encoder so that we have four choices of home over a 360 degree arc. In our particular design the elevation axis uses an augmented, compressed 2-bit absolute Gray encoder. Whereas we have 360 degrees of motion in the azimuth axis, in our elevation axis we are limited to about 110 degrees of motion. To preserve our home opportunities we are compressing the 2-bit Gray pattern into those 110 degrees so that we still have four choices of home over our limited 110 degrees of arc. In addition, we are adding a third bit that asserts when the elevation axis moves outside the legal 110 degrees of arc. That third bit acts as an electronic brake, and signals to the microprocessor controlling the elevation motor to stop before mechanical hard stops are hit.

Heretofore, regardless of method or mode, position information has been determined by actual measurement of angular position around an axis. This is safest, as actual measurements serve to keep the microprocessor in the position control loop "sane." Inferring angular position means that the control microprocessor must calculate and account for position information at all times, and in busy software systems, with interrupts and other system events that need attention, it is possible for microprocessor software to fall behind in its task load and lose detailed position information. Allowing the controlling microprocessor to make actual measurement minimizes the chances that the microprocessor will "get lost."

But, it is possible to increase angular position resolution by interpolating position between measurement points. In particular, a control microprocessor driving a BLDC motor commands the angle of the rotating stator magnetic field by the relative on/off ratios of the PWMs controlling the circuitry that drives currents through the stator windings. Given sufficient current to generate enough torque, the rotor will follow the angle of the stator's magnetic field. In theory, one could chose any drive angle, subject only to the on/off ratio resolution of the PWMs, and thereby achieve very fine angular positioning between angular measurement points Although the invention has been described in detail with reference to particular examples and embodiments, the examples and embodiments contained herein are merely illustrative and are not an exhaustive list. Variations and modifications of the present invention will readily occur to those skilled in the art. The present invention includes all such modifications and equivalents. The claims alone are intended to set forth the limits of the present invention.

What we claim is:

1. A mobile communications system comprising:
   a compact high-efficiency integrated direct wave mobile communications terminal,
   a non-symmetric multi-curve microwave refractor,
   a low profile positioning system,
   a multi-encoder off center precision positioning technique,
   a position control method using synthetic counting with a gray scale encoder
   a multi-stage compact Low Noise Block-downconverter (LNB).

2. A mobile communications system as claimed in claim 1 wherein the terminal provides an integrated refractor, mount, and frequency conversion component.

3. A mobile communications system as claimed in claim 2 wherein satellite signals are collected, amplified and transmitted to the frequency conversion component without the use of reflections.

4. A mobile communications system as claimed in claim 1 wherein the refractor is made from Ultra-High-Molecular-Weight Polyethylene (UHMWPE).

5. A mobile communications system as claimed in claim 1 wherein the refractor is tuned and focused through a combination of non-symmetric curved surfaces.

6. A mobile communications system as claimed in claim 1 wherein the refractor is held in position with a horn shaped structure.

7. A mobile communications system as claimed in claim 1 wherein a signal is transmitted to electronics without a horn.

8. A mobile communications system as claimed in claim 1 wherein said Low Noise Block-downconverter is integrated into the compact antenna terminal.

9. A mobile communications system as claimed in claim 8 wherein said Low Noise Block-downconverter is modular.

10. A mobile communications system as claimed in claim 1 wherein a low profile compact positioning system is used to point the integrated direct wave terminal.

11. A mobile communications system as claimed in claim 1 wherein two off center encoders are used for precise position sensing.

12. A mobile communications system as claimed in claim 1 wherein a synthetic counting encoder uses Brushless Direct Current motor Hall-effect sensor patterns, and from said patterns provides both counting and direction information for relative position control in combination with an absolute Gray encoder.

13. A mobile communications system as claimed in claim 1 wherein an elevation slip ring includes integrated position limit sensing.

* * * * *